(12) United States Patent
Preysman et al.

(10) Patent No.: US 8,347,233 B2
(45) Date of Patent: Jan. 1, 2013

(54) MEASURED VALUE VISUALIZATION

(75) Inventors: Vladimir Preysman, Sunnyvale, CA (US); Stefan Braun, Eggenstein-Leopoldshafen (DE); Martin Dittmer, Karlsruhe (DE)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 355 days.

(21) Appl. No.: 12/627,795

(22) Filed: Nov. 30, 2009

(65) Prior Publication Data

US 2010/0313162 A1 Dec. 9, 2010

Related U.S. Application Data

(60) Provisional application No. 61/184,508, filed on Jun. 5, 2009.

(51) Int. Cl.
G06F 3/048 (2006.01)
G06G 7/50 (2006.01)

(52) U.S. Cl. .......................... 715/833; 703/9
(58) Field of Classification Search .................. 715/833; 703/9, 10, 21
See application file for complete search history.

(56) References Cited

U.S. PATENT DOCUMENTS

| | | | |
|---|---|---|---|
| 5,751,285 A * | 5/1998 | Kashiwagi et al. | 715/833 |
| 6,289,299 B1 * | 9/2001 | Daniel et al. | 703/21 |
| 7,134,323 B1 * | 11/2006 | Discenzo | 73/53.05 |
| 7,725,221 B2 * | 5/2010 | Maris | 701/14 |
| 7,765,491 B1 * | 7/2010 | Cotterill | 715/833 |
| 7,865,838 B2 * | 1/2011 | Feig et al. | 715/786 |
| 2005/0051167 A1 * | 3/2005 | Biondi et al. | 128/204.21 |
| 2005/0102067 A1 * | 5/2005 | Nelson et al. | 700/266 |
| 2006/0231500 A1 * | 10/2006 | Speece et al. | 210/739 |
| 2007/0083152 A1 * | 4/2007 | Williams et al. | 604/65 |
| 2008/0201663 A1 * | 8/2008 | Etgen | 715/833 |
| 2009/0265295 A1 * | 10/2009 | Hartman et al. | 706/46 |
| 2011/0178963 A1 * | 7/2011 | Hartman et al. | 706/12 |

* cited by examiner

*Primary Examiner* — Rashawn Tillery
(74) *Attorney, Agent, or Firm* — Fletcher Yoder PC; William R. Walbrun; John M. Miller

(57) ABSTRACT

The embodiments of the present invention provide novel techniques for visualizing parameter values, such as parameter values measured in an industrial measurement process. In particular, the disclosed embodiments provide visualization techniques for re-scaling a representation of a target parameter range with respect to an overall parameter range for a parameter value. Re-scaling the representation of the target parameter range effectively provides continuous dynamic zooming for the measured parameter value. This allows for better visualization as well as providing continuous feedback to an operator of the industrial measurement process regarding the current measured parameter value, thereby facilitating faster and more accurate operation of the industrial measurement process.

17 Claims, 6 Drawing Sheets

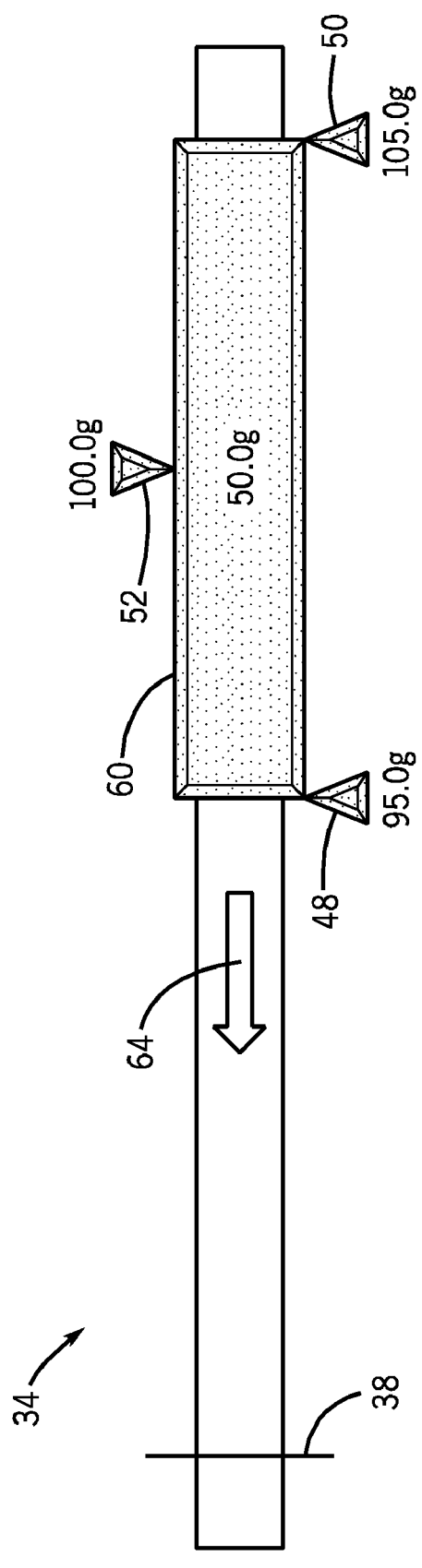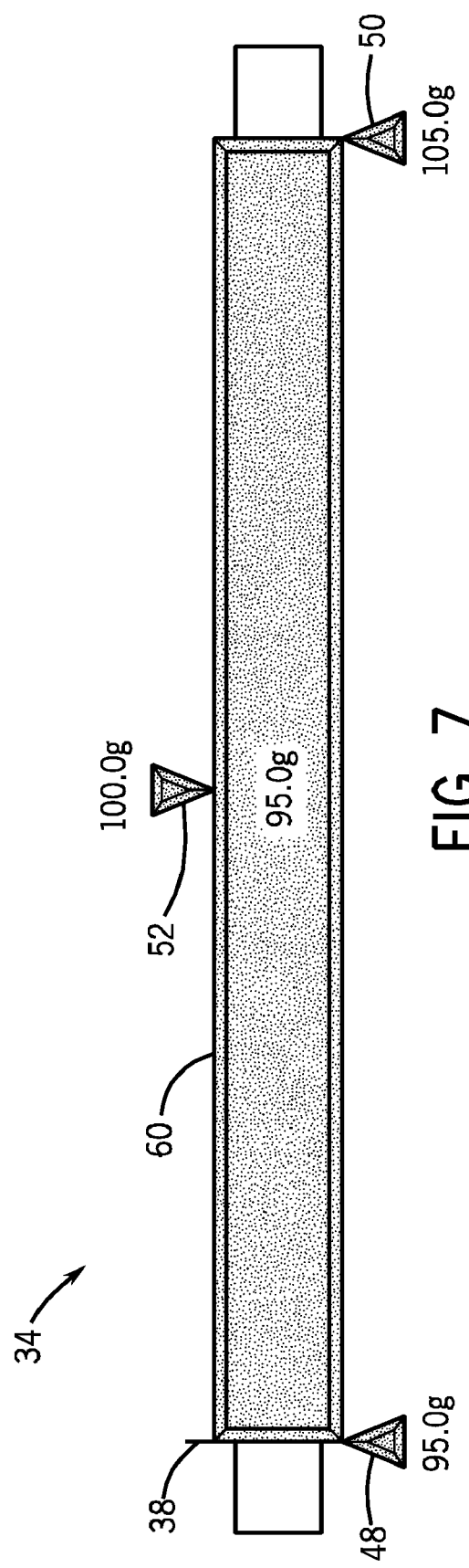

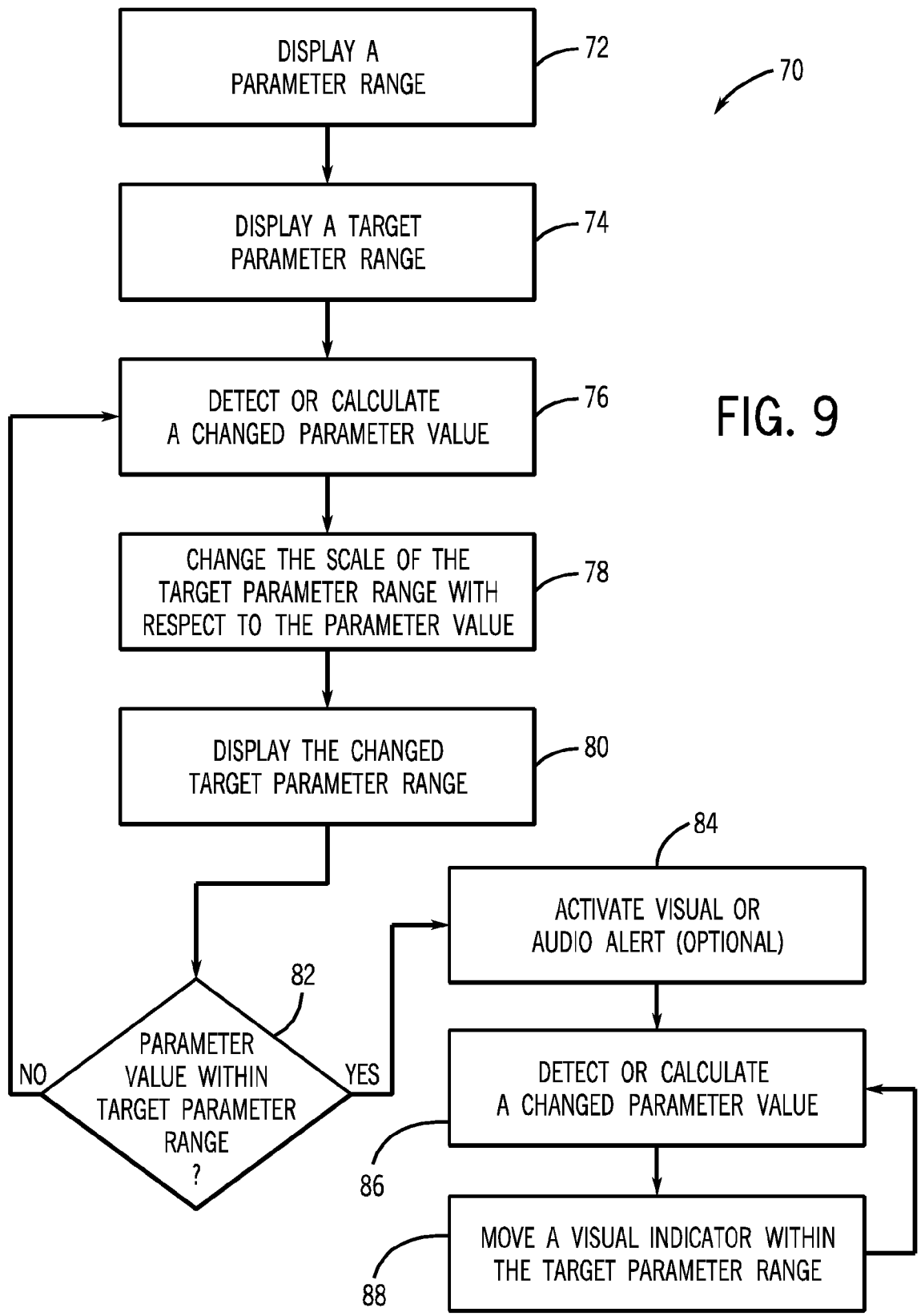

MEASURED VALUE VISUALIZATION

CROSS REFERENCE TO RELATED APPLICATIONS

This application is a Non-Provisional Application of U.S. Provisional Application No. 61/184,508, entitled "Measured Value Visualization," filed Jun. 5, 2009, which is herein incorporated by reference.

BACKGROUND

The invention relates generally to the field of industrial data visualization systems. More particularly, embodiments of the present invention relate to techniques for visualizing measured parameter values with respect to target or tolerance limit parameter values on a display device.

In industrial data visualization systems, a common form of visualization of a parameter value is a linear representation depicted as extending from a fixed starting point (e.g., zero) to a fixed ending point (e.g., an upper value limit). As the parameter value increases, a bar representing the parameter value typically moves along the linear representation from the starting point to the ending point. A drawback of this type of visualization is that target values and tolerance ranges generally remain fixed in the linear representation and also may occupy only a very small portion of the linear representation, reducing the utility of the visualization.

BRIEF DESCRIPTION

The embodiments of the present invention provide novel techniques for visualizing parameter values, such as parameter values measured in an industrial measurement process. In particular, the disclosed embodiments provide visualization techniques for re-scaling a representation of a target parameter range with respect to an overall parameter range for a parameter value. Re-scaling the representation of the target parameter range effectively provides continuous dynamic zooming for the measured parameter value. This allows for better visualization as well as providing continuous feedback to an operator of the industrial measurement process regarding the current measured parameter value, thereby facilitating faster and more accurate operation of the industrial measurement process.

DRAWINGS

These and other features, aspects, and advantages of the present invention will become better understood when the following detailed description is read with reference to the accompanying drawings in which like characters represent like parts throughout the drawings, wherein:

FIG. 6 is an exemplary representation of the measured parameter value displayed on the display space, where a target parameter value bar having a first color is moving in a first direction toward a current measured parameter value indicator;

FIG. 7 is an exemplary representation of the measured parameter value displayed on the display space, where a lower parameter value limit indicator of the target parameter value bar has reached the current measured parameter value indicator and the target parameter value bar has changed to a second color;

FIG. 9 is an exemplary embodiment of a method for scaling a target parameter range, which is a subset of an overall parameter range.

DETAILED DESCRIPTION

Figure 1:
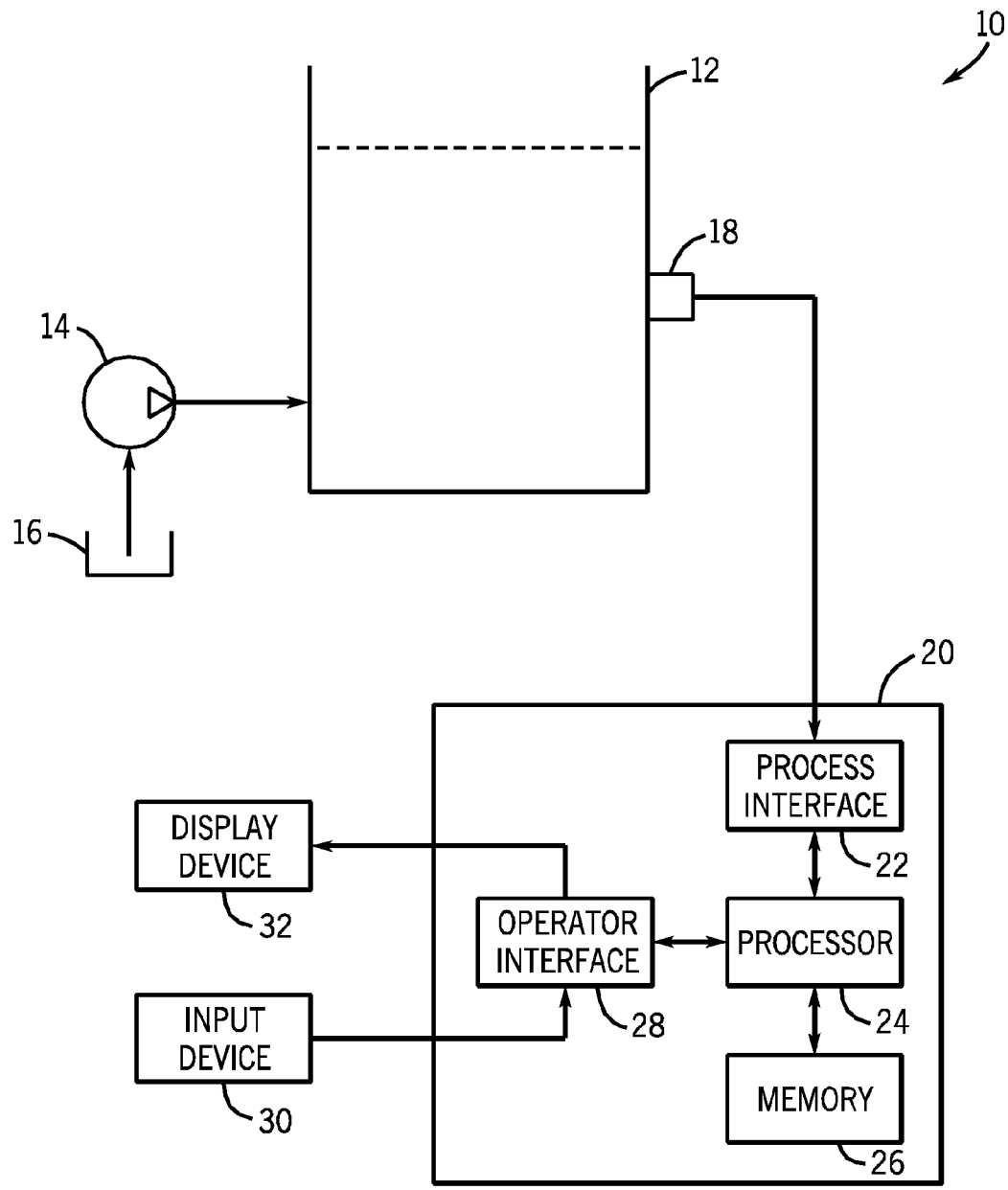
FIG. 1 is a block diagram illustrating an exemplary embodiment of an industrial measurement process.

FIG. 1 is a block diagram of an exemplary embodiment of an industrial measurement process 10, which may utilize the disclosed methods and techniques for visualizing measured parameter values with respect to target or tolerance limit parameter values. As illustrated, the industrial measurement process 10 may include a container 12, into which one or more measured substances may be dispensed. The container 12 may be a flask, tank, tray, receptacle, or any other container capable of containing the one or more measured substances. One or more dispensing devices 14 may be used to draw the one or more measured substances from one or more sources 16. For example, the one or more dispensing devices 14 may include valves and pumps, which may draw substances from the sources 16 and input them into the container 12.

However, in general, the embodiments disclosed herein may be particularly beneficial for industrial measurement processes 10 which include manual dispensing of substances into the container 12. For example, manual dispensing processes may include the manual measurement of pharmaceutical ingredients into pharmaceutical products, the manual mixing of food ingredients, and so forth. However, in general, the embodiments disclosed herein may be used with any industrial measurement processes 10 where substances are measured or combined in bulk units versus discrete units. In certain embodiments, the dispensing devices 14 illustrated in FIG. 1 may simply include a measurement device, such as a scoop or pipette, which an operator may use to manually extract a substance from a source 16 and manually dispense the substance into the container 12. Moreover, the visualization techniques may be used to visualize values of virtually any changing parameter value, whether measured or calculated. For example, similar representations may be used for visualizing changes in position parameters (e.g., as a component approaches a target position), weight parameters, fill level measurements, or any other suitable application. Similarly, while the technique is particularly attractive for manually controlled processes (due to the enhanced detail and intuitive nature of the representation, useful for manually closing a control loop), the same representations may be used for simply monitoring or representing automatically or quasi-automated process changes.

As illustrated in FIG. 1, the industrial measurement process 10 may also include one or more sensors 18 for measuring a parameter value of interest relating to the one or more substances in the container 12. For example, in certain embodiments, the sensors 18 may include sensors configured to measure the weight of the one or more substances in the container 12. However, in other embodiments, the sensors 18 may include sensors configured to measure a tank level of the container 12. In general, any sensors 18 capable of measuring a parameter value of interest (e.g., mass, weight, volume, level, distance, density, temperature, pressure, color, and so forth) may be used. As illustrated, signals relating to the measured parameter values may be transmitted to a control and measurement system 20.

In particular, the sensors 18 may communicate with the control and measurement system 20 via one or more process interfaces 22 coupled to the control and measurement system 20. The process interfaces 22 may receive input signals from the sensors 18 indicative of measured parameter values of interest of the substances within the container 12. The process interfaces 22 may be integrated with the control and measurement system 20, or may be added or removed via expansion slots, bays or other suitable mechanisms. For example, to add functionality to the control and measurement system 20, additional process interfaces 22 may be added, such as if new sensors 18 are added to measure additional parameter values of the industrial measurement process 10. These process interfaces 22 serve as electrical interfaces and may be located proximate or remote from the control and measurement system 20, including remote or local network process interfaces. Thus, in certain embodiments, the process interfaces 22 may be located in close proximity to the control and measurement system 20 or remote from the control and measurement system 20. Information from the sensors 18 may be communicated with remote modules over a common communication link, or network, wherein modules on the network communicate via a standard communications protocol. For example, many industrial controllers can communicate via network technologies such as Ethernet (e.g., IEEE802.3, TCP/IP, UDP, EtherNet/IP, and so forth), ControlNet, DeviceNet, or other network protocols (Foundation Fieldbus (H1 and Fast Ethernet) Modbus TCP, Profibus) and also communicate to higher level computing systems.

The control and measurement system 20 may further include a processor 24, which may read and write to a memory 26. The memory 26 may hold programs executed by the processor 24 to provide desired functions and also variables and data necessary for the execution of those programs. Input data from the sensors 18 are collected from the process interfaces 22 and communicated to the processor 24. The processor 24 performs logic operations on the input data to produce output. Inputs and outputs may be recorded in the memory 26. The control and measurement system 20 may also include an operator interface 28. The operator interface 28 may be used to receive inputs from an operator of the industrial measurement process 10 via an input device 30 (e.g., keypad or touch-screen) and to transmit outputs to an operator via a display device 32 (e.g., a graphical component or physical display screen).

In particular, in certain embodiments, the signals indicative of measured parameter values may be transmitted to the control and measurement system 20 and may be converted into digital values by the process interfaces 22. The processor 24 may process these measured parameter values and display them on the display device 32. For example, in certain embodiments, actual numerical values may be displayed on the display device 32 (e.g., a mass of "2.2 grams," a weight of "1.5 pounds," and so forth). However, in accordance with the disclosed embodiments, the measured parameter values may be depicted on the display device 32 in graphical form. For example, a common form of visualization is a linear representation of the measured parameter value shown as a bar parallel to a vertical or horizontal axis. In certain embodiments, the axis may include tic marks and/or textual value indicia.

This type of linear representation of measured parameter values may be used by operators to determine when target parameter values and tolerance ranges (e.g., including lower and upper parameter value limits) are approached. As the operator manually adds one of the substances into the container 12, the operator may watch the linear representation to determine when the target parameter value or tolerance range for the measured parameter value has been achieved. In general, the linear representation may be depicted as extending from a starting point (typically zero) to an upper parameter value limit (or slightly beyond the upper parameter value limit), with the target parameter value and lower parameter value limit fixed between the starting point and the upper parameter value limit. As more of the substance is added into the container 12 by the operator, a bar representing the measured parameter value will move along the linear representation toward the lower parameter value limit, target parameter value, and upper parameter value limit. Again, in this type of linear representation, the starting point, lower parameter value limit, target parameter value, and upper parameter value limit generally remain fixed in location along the linear representation while the bar representing the measured parameter value moves. It should be understood that as used herein, the term "limit" generally indicates the outer periphery of a target or tolerance range. In practice, both in dispensing applications and in others, the actual value that the parameter may assume may be lower than the lower tolerance "limit" or higher than the upper tolerance "limit."

One drawback of conventional linear representations of this type is that the tolerance area (e.g., between the lower and upper parameter value limits) typically occupies a very small portion of the screen, reducing the utility of the visualization. This is particularly true in industrial measurement processes 10 requiring smaller acceptable tolerance ranges. In order to alleviate this problem, a zooming capability may be provided with an enlarged scale for the tolerance area (e.g., between the lower and upper parameter value limits) once the lower parameter value limit has been reached. This approach still has the drawback that it may be difficult for the operator to judge how and when to slow down the rate of addition as the parameter value approaches the tolerance area without either being too slow or overshooting.

Indeed, a common concern when using these types of visualization is overshoot, where more of a substance is added into the container 12 than allowable (e.g., above the upper parameter value limit). In certain situations, overshoot can prove critical since attempting to remove a portion of a substance from the container 12 may result in contamination, thereby causing the entire batch to be greatly or completely reduced in value. Therefore, two main considerations are important for operators of the industrial measurement processes 10, namely, the operator must be able to (1) add and/or mix the substances as fast as possible, and (2) achieve a measured parameter value between the upper and lower tolerance limits.

The disclosed embodiments address the drawbacks of the techniques described above by presenting an alternative form of visualization of measured parameter values. In particular, instead of moving a bar indicative of the measured parameter value toward the lower parameter value limit, target parameter value, and upper parameter value limit, the current value of the measured parameter value is fixed in one location and the lower parameter value limit and target parameter value are moved along the representation toward the current parameter value. As such, the distance between the current parameter value and the lower parameter value limit and target parameter value is continually re-scaled. This provides the effect of continuous dynamic zooming.

In certain embodiments, once the lower parameter value limit is exceeded by the current measured parameter value, the lower parameter value limit, target parameter value, and upper parameter value limit may become fixed along the representation and zooming may cease. At this point, the current measured parameter value may begin moving relative to the lower parameter value limit, target parameter value, and upper parameter value limit. The disclosed embodiments enable better utilization of display space on the display device 32 as well as enabling continuous feedback to the operator, which may allow for more accurate addition and/or mixing of substances within the container 12.

Figure 2:
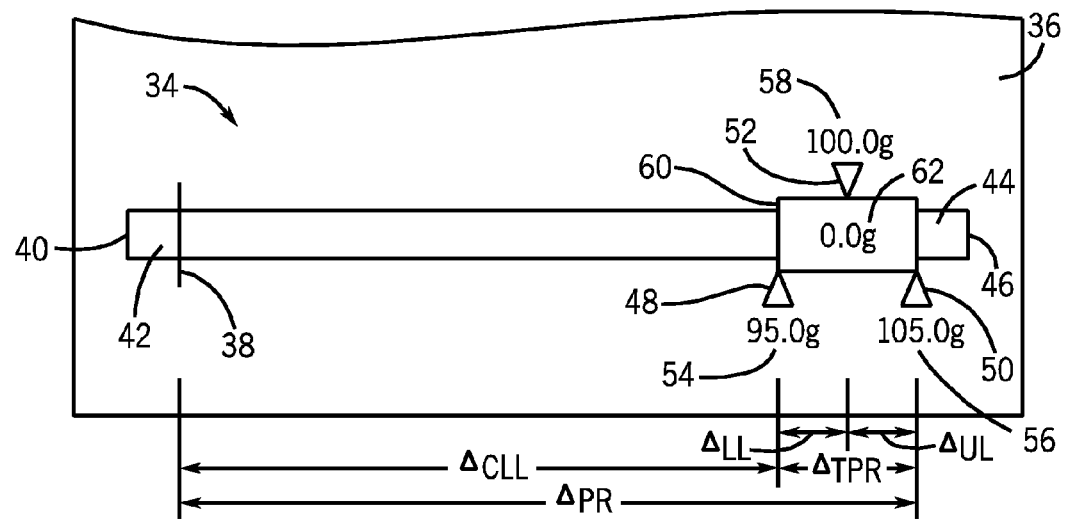
FIG. 2 is an exemplary representation of an initial measured parameter value displayed on a display space of a display device.

FIGS. 2 through 8 are exemplary representations 34 of a measured parameter value displayed on a display space of the display device 32 utilizing the disclosed techniques. For example, FIG. 2 is an exemplary representation 34 of an initial measured parameter value displayed on a display space 36. In practice, at the beginning of the industrial measurement process 10, the contribution of the container 12 with respect to the measured parameter value may be accounted for. For example, the operator may begin by placing the container 12 on a scale and zeroing out the measured parameter value output from the scale value, thereby removing the effect of the container 12 on the measured parameter value. This may generally be referred to as initializing or "taring" the industrial measurement process 10. Accordingly, in general, at the beginning of the industrial measurement process 10, the initial measured parameter value may typically be zero. However, this does not have to be the case and, in other embodiments, the initial measured parameter value may not be equal to zero.

Once the industrial measurement process 10 has been initialized, the initial measured parameter value may be displayed on the display space 36 of the display device 32. As illustrated, in certain embodiments, the representation 34 of the measured parameter value may be visualized on the display space 36 as a generally horizontal line or bar. However, in other embodiments, the representation 34 may be visualized on the display space 36 as a generally vertical line or bar, a diagonal line or bar, or a combination thereof.

In general, the representation 34 of the measured parameter value may include a visual indictor for the current measured parameter value 38. As illustrated, in certain embodiments, the current measured parameter value indicator 38 may include a tick mark, which intersects the representation 34. However, in other embodiments, the current measured parameter value indicator 38 may include other forms of visual indicators. Moreover, in certain embodiments, no current measured parameter value indicator 38 may be used. For example, a first end 40 of the representation 34 may be used to indicate the current measured parameter value. In other words, it may be understood by the operator that the end 40 of the representation 34 indicates the current measured parameter value.

However, as illustrated, in certain embodiments, the representation 34 may include first and second end portions 42, 44 at first and second ends 40, 46 of the representation 34. In general, the first and second end portions 42, 44 may only be used in applications where undershoot and overshoot are acceptable or where the extra area on the display space 36 taken by the first and second end portions 42, 44 is considered expendable. However, in general, the representation 34 will typically take up as much of the area on the display space 36 as possible. In embodiments where the first and second end portions 42, 44 are used, the first and second end portions 42, 44 may generally only take up a small portion of the display space 36. For example, both the first and second end portions 42, 44 will generally only constitute, at most, 5% of the total length of the representation 34.

As illustrated, in addition to the current measured parameter value indicator 38, the representation 34 on the display space 36 may include indicators for a lower parameter value limit 48, an upper parameter value limit 50, and a target parameter value 52. In addition, in certain embodiments, the lower parameter value limit indicator 48, upper parameter value limit indicator 50, and target parameter value indicator 52 may be associated with respective textual value indicators 54, 56, 58, which indicate the actual numerical values for the lower parameter value limit, upper parameter value limit, and target parameter value, respectively. For example, in the illustrated embodiment, the lower parameter value limit is equal to 95.0 grams, the target parameter value is equal to 100.0 grams, and the upper parameter value limit is equal to 105.0 grams. In general, the lower parameter value limit, upper parameter value limit, and target parameter value may be determined by the processor 24 of the control and measurement system 20 of FIG. 1 and may not typically be determined by the operator. In particular, in certain embodiments, the lower parameter value limit, upper parameter value limit, and target parameter value may be accessed from the memory 26 by the processor 24.

Returning now to FIG. 2, in certain embodiments, a tolerance area between the lower and upper parameter value limits may be depicted by a target parameter range bar 60, which may extend along the representation 34 from the lower parameter value limit indicator 48 to the upper parameter value limit indicator 50. In addition, in certain embodiments, a textual indicator 62 indicating the current measured parameter value may be displayed within the target parameter range bar 60. For example, in the representation 34 of the initial measured parameter value of FIG. 2, the textual indicator 62 illustrates the initial measured parameter value as 0.0 grams. However, in other embodiments, the current measured parameter value textual indicator 62 may either be placed in another location on the display space 36 or not used at all.

Several dimensions of the representation 34 of the measured parameter value are introduced in FIG. 2 for the purpose of describing the disclosed embodiments. In particular, the distance between the lower parameter value limit indicator 48 and the target parameter value indicator 52 is depicted as the lower limit distance $\Delta_{LL}$, the distance between the target parameter value indicator 52 and the upper parameter value limit indicator 50 is depicted as the upper limit distance $\Delta_{UL}$, and the distance between the lower parameter value limit indicator 48 and the upper parameter value limit indicator 50 (e.g., the target parameter range) is depicted as the target parameter range distance $\Delta_{TPR}$. In addition, the distance between the current measured parameter value indicator 38 and the lower parameter value limit indicator 48 is depicted as the current-to-lower limit distance $\Delta_{CLL}$ and the distance between the current measured parameter value indicator 38 and the upper parameter value limit indicator 50 (e.g., the overall parameter range) is depicted as the parameter range distance $\Delta_{PR}$. In particular, in certain embodiments, the relationship between the current-to-lower limit distance $\Delta_{CLL}$ and the parameter range distance $\Delta_{PR}$ may be described as a function of the current measured parameter value (e.g., "Current"), the upper parameter value limit (e.g., "UL"), the lower parameter value limit (e.g., "LL"), and the parameter range distance $\Delta_{PR}$. For example, in certain embodiments, the following equation may be used:

$$\Delta_{CLL} = \Delta_{PR} \times (LL - \text{Current})/(UL - \text{Current})$$

Figure 3:
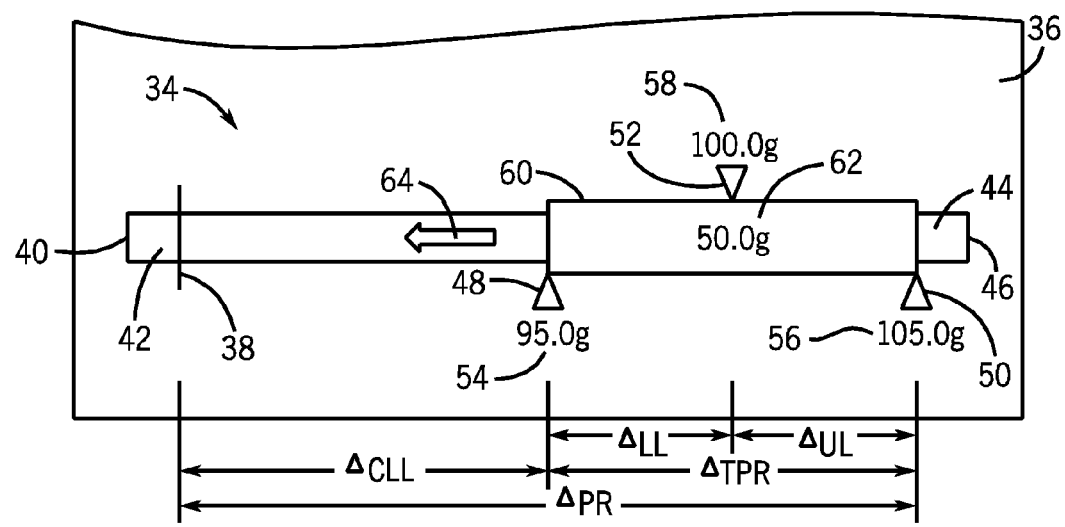
FIG. 3 is an exemplary representation of the measured parameter value displayed on the display space, where the current measured parameter value is increasing toward a lower parameter value limit, a target parameter value, and an upper parameter value limit.

As described above, as the operator adds more of a substance to the container 12 of FIG. 1, the measured parameter value may increase. FIG. 3 is an exemplary representation 34 of the measured parameter value displayed on the display space 36, where the current measured parameter value is increasing toward the lower parameter value limit, the target parameter value, and the upper parameter value limit. In particular, the illustrated current measured parameter value textual indicator 62 indicates that the current measured parameter value has increased to 50.0 grams. As such, the current measured parameter value is still less than the lower parameter value limit (95.0 grams), target parameter value (100.0 grams), and upper parameter value limit (105.0 grams), but is increasing.

As the measured parameter value continues to increase, the target parameter range (e.g., the tolerance area between the lower parameter value limit indicator 48 and the upper parameter value limit indicator 50) may be continuously re-scaled relative to the overall parameter range (e.g., the distance between the current measured parameter value indicator 38 and the upper parameter value limit indicator 50). More specifically, as the measured parameter value continues to increase, the target parameter range bar 60 may expand over the display space 36, as illustrated by arrow 64. In particular, the current measured parameter value indicator 38 and the upper parameter value limit indicator 50 may remain generally fixed on the display space 36 while the lower parameter value limit indicator 48 (as well as the target parameter value indicator 52) moves toward the current measured parameter value indicator 38 on the display space 36, as illustrated by arrow 64. In general, the target parameter range bar 60 approaches the current parameter value indicator 38 from only one direction.

As the target parameter range bar 60 expands over the display space 36, the dimensions of the representation 34 will change. For example, as the current measured parameter value increases, both the lower limit distance $\Delta_{LL}$ and the upper limit distance $\Delta_{UL}$ will generally increase in proportion to each other. As such, the target parameter range distance $\Delta_{TPR}$ will increase relative to the current-to-lower limit distance $\Delta_{CLL}$, such that the target parameter range distance $\Delta_{TPR}$ occupies a larger portion of the parameter range distance $\Delta_{PR}$ on the display space 36.

Figure 4:
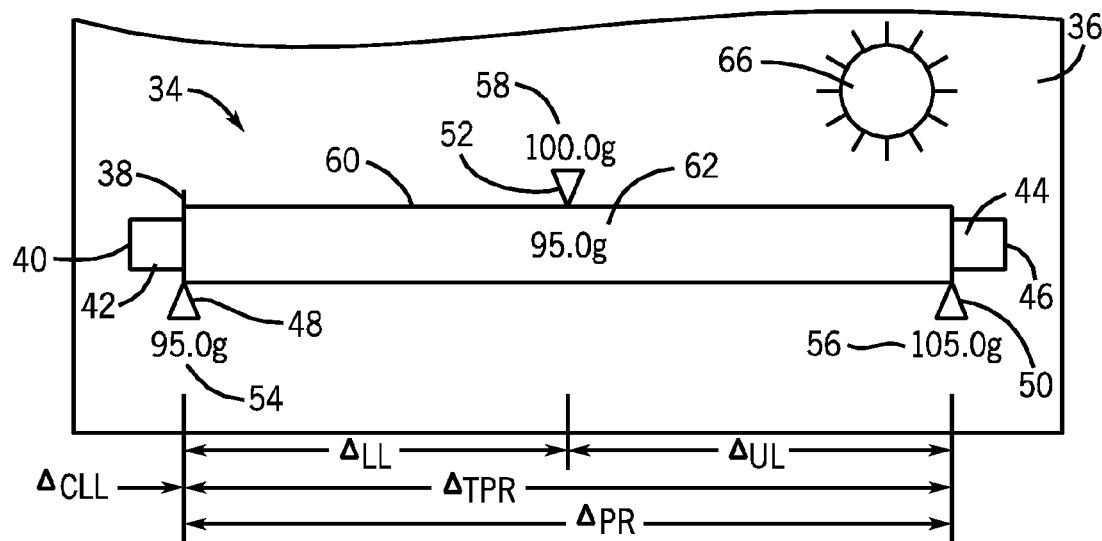
FIG. 4 is an exemplary representation of the measured parameter value displayed on the display space, where the current measured parameter value has reached the lower parameter value limit.

At some point, the operator may have added enough of a substance into the container 12 of FIG. 1 that the measured parameter value reaches the lower parameter value limit, indicated by the lower parameter value limit indicator 48. FIG. 4 is an exemplary representation 34 of the measured parameter value displayed on the display space 36, where the current measured parameter value has reached the lower parameter value limit. In particular, the illustrated current measured parameter value textual indicator 62 indicates that the current measured parameter value has reached 95.0 grams, which is equal to the lower parameter value limit of 95.0 grams.

As described above, the target parameter range (e.g., the tolerance area between the lower parameter value limit indicator 48 and the upper parameter value limit indicator 50) is continuously re-scaled relative to the overall parameter range (e.g., the distance between the current measured parameter value indicator 38 and the upper parameter value limit indicator 50) while the current measured parameter value is less than the lower parameter value limit. However, once the current measured parameter value reaches the lower parameter value limit, the target parameter range bar 60 has expanded such that the current measured parameter value indicator 38 and the lower parameter value limit indicator 48 are generally at the same location on the display space 36. As such, the target parameter range bar 60 will have expanded such that it takes up a majority of the representation 34 on the display space 36. The lower limit distance $\Delta_{LL}$ and the upper limit distance $\Delta_{UL}$, will generally have continued to increase in proportion to each other. In addition, the target parameter range distance $\Delta_{TPR}$ will have increased to a point where the target parameter range distance $\Delta_{TPR}$ and the parameter range distance $\Delta_{PR}$ are generally equal and the current-to-lower limit distance $\Delta_{CLL}$ will have decreased to approximately zero.

In certain embodiments, once the current measured parameter value approaches or reaches the lower parameter value limit, an alert indicator may be displayed on the display space 36 or otherwise activated. The alert indicator may be a visual indicator, an audio indicator, a textual indicator, or any other type of indicator that may indicate to the operator that the current measured parameter value has reached the lower parameter value limit or is approaching the lower parameter value limit (e.g., is within a pre-determined percentage, such as 5%, of the lower parameter value limit). For example, in certain embodiments, a visual indicator may include the target parameter range bar 60 blinking, changing color, and so forth. In other embodiments, any of the other components displayed on the display space 36 may also start blinking, changing color, or otherwise causing a visual indication. In addition, a visual alert may be indicated by a separate visual indicator 66 displayed on the display space 36.

Furthermore, the alert indicator may change over time as the current measured parameter value approaches the lower parameter value limit, reaches the lower parameter value limit, surpasses the lower parameter value limit, reaches the target parameter value, approaches the upper parameter value limit, and so forth. For example, in certain embodiments, a visual alert may begin blinking at a faster rate as the current measured parameter value approaches, reaches, and surpasses these parameter values. In other embodiments, an audio indicator may become louder and/or at a higher pitched frequency as the current measured parameter value approaches, reaches, and surpasses these parameter values.

Figure 5:
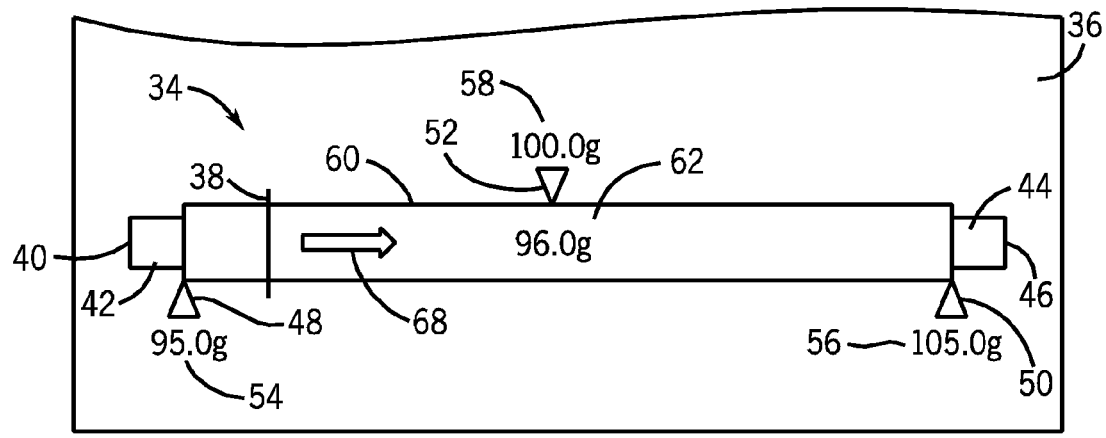
FIG. 5 is an exemplary representation of the measured parameter value displayed on the display space, where the current measured parameter value is increasing between the lower parameter value limit and the upper parameter value limit.

In certain embodiments, after the measured parameter value has reached the lower parameter value limit, the current measured parameter value indicator 38 may begin moving relative to a fixed target parameter range bar 60. FIG. 5 is an exemplary representation 34 of the measured parameter value displayed on the display space 36, where the current measured parameter value is increasing between the lower parameter value limit indicator 48 and the upper parameter value limit indicator 50. In particular, the illustrated current measured parameter value textual indicator 62 indicates that the current measured parameter value has increased to 96.0 grams, which is between the lower parameter value limit of 95.0 grams and the upper parameter value limit of 105.0 grams. As illustrated by arrow 68, as the measured parameter value continues to increase beyond the lower parameter value limit, the current measured parameter value indicator 38 may move within the target parameter range bar 60, which may be fixed within the display space 36. However, in other embodiments, alternative indicators of the current measured parameter value moving between the lower parameter value limit indicator 48 and the upper parameter value limit indicator 50 may be used. For example, a separate bar may be displayed on the display space 36 to indicate the current measured parameter value moving between the lower parameter value limit indicator 48 and the upper parameter value limit indicator 50.

Therefore, as illustrated in FIGS. 2 through 5, as the measured parameter value increases, the target parameter range bar 60 expands in a first direction toward the current measured parameter value indicator 38 until the lower parameter value limit indicator 48 reaches or approaches the current measured parameter value indicator 38. At that point, a visual distinction of the target parameter range bar 60 may occur. For example, in certain embodiments, the target parameter range bar 60 may change from a first color to a second color or to a darker shade of the first color. Then, as the measured parameter value continues to increase, the current measured parameter value indicator 38 begins moving in a second direction, which is directly opposite to the first direction.

Figure 8:
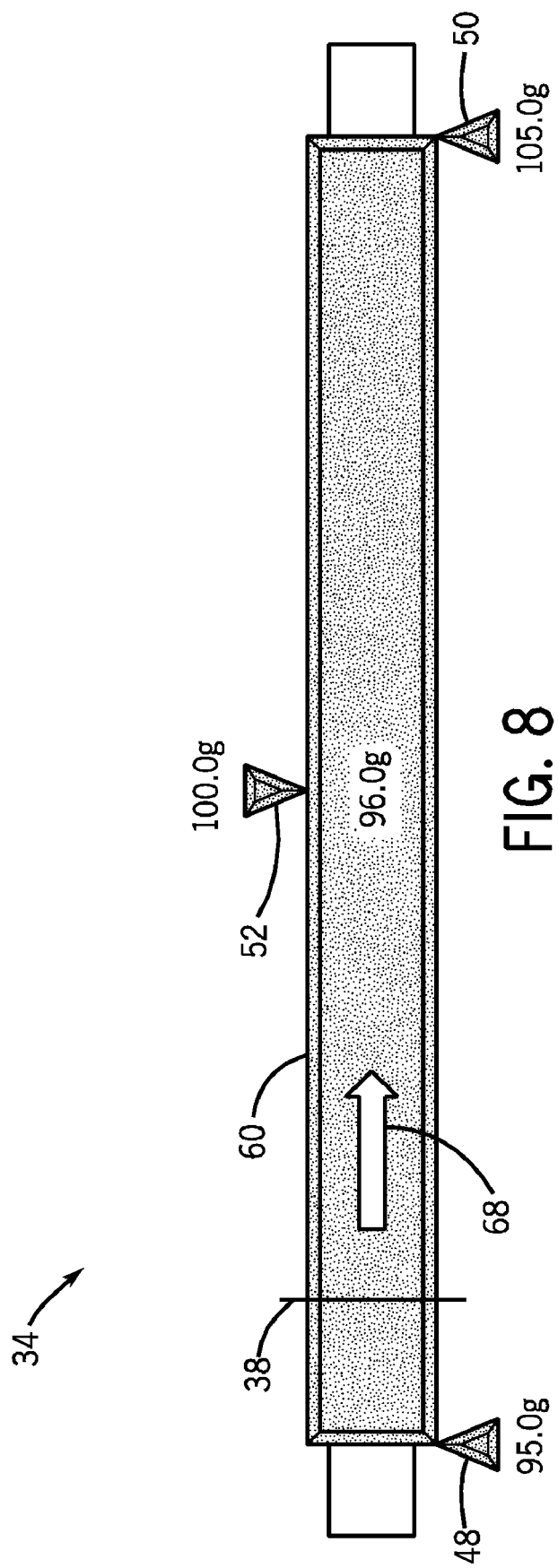
FIG. 8 is an exemplary representation of the measured parameter value displayed on the display space, where the current measured parameter value indicator is moving in a second direction opposite to the first direction.

For example, FIG. 6 is an exemplary representation 34 of the measured parameter value displayed on the display space 36, where the target parameter value bar 60 having a first color is moving in a first direction toward the current measured parameter value indicator 38. As illustrated, the first direction is generally indicated by arrow 64. The hatching of the target parameter value bar 60 is indicative of the first color. In certain embodiments, once the lower parameter value limit indicator 48 of the target parameter value bar 60 reaches or approaches the current measured parameter value indicator 38, the target parameter value bar 60 may change to a second color. FIG. 7 is an exemplary representation 34 of the measured parameter value displayed on the display space 36, where the lower parameter value limit indicator 48 of the target parameter value bar 60 has reached the current measured parameter value indicator 38 and the target parameter value bar 60 has changed to a second color. As illustrated in FIG. 7, the hatching of the target parameter value bar 60 is different than the hatching of the target parameter value bar 60 in FIG. 6. This is intended to convey a change in color of the target parameter value bar 60. As described above, the change in color may include a change to a different color or merely a change in hue, brightness, and so forth, of the first color. In certain embodiments, after the lower parameter value limit indicator 48 of the target parameter value bar 60 reaches or approaches the current measured parameter value indicator 38, the current measured parameter value indicator 38 may begin moving in a second direction, which is opposite to the first direction. FIG. 8 is an exemplary representation 34 of the measured parameter value displayed on the display space 36, where the current measured parameter value indicator 38 is moving in a second direction opposite to the first direction. As illustrated, the second direction is generally indicated by arrow 68.

FIG. 9 is an exemplary embodiment of a method 70 for scaling the target parameter range (e.g., illustrated by the target parameter range distance $\Delta_{TPR}$ in FIGS. 2 through 4), which is a subset of the overall parameter range (e.g., illustrated by the parameter range distance $\Delta_{PR}$ in FIGS. 2 through 4). At step 72, the overall parameter range may be displayed on the display space 36 of the display device 32. For example, the overall parameter range depicted by the representation 34 in FIGS. 2 through 8 may be displayed on the display space 36. At step 74, the target parameter range may also be displayed on the display space 36 of the display device 32. For example, the target parameter range depicted by the target parameter range bar 60 in FIGS. 2 through 8 may be displayed on the display space 36.

At step 76, a changed parameter value may be detected or calculated. As described above with respect to FIG. 1, one or more sensors 18 may detect the parameter value and transmit a signal representative of the parameter value to one or more process interfaces 22 of the control and measurement system 20. The process interfaces 22 may convert the signal representative of the parameter value into parameter value data, which may be used by the processor 24 of the control and measurement system 20 to scale the target parameter range. At step 78, the scale of the target parameter range may be changed with respect to the overall parameter range as the parameter value changes. In particular, as described above, as the parameter value increases, the target parameter range increases with respect to the overall parameter range. At step 80, the changed (e.g., re-scaled) target parameter range may be displayed on the display space 36 of the display device 32. For example, the target parameter range depicted by the target parameter range bar 60 in FIGS. 2 through 8 may be re-scaled and re-displayed on the display space 36.

At step 82, a determination may be made whether the parameter value is within the target parameter range. If the parameter value is not within the target parameter range, the method 70 may continue back to step 76 where another changed parameter value may be detected or calculated. However, if the parameter value has increased to a point where it is within the target parameter range, the method 70 may instead continue to step 84, where a visual, audio, or other type of alert indicator may optionally be activated to alert an operator that the parameter value has entered the target parameter range or is approaching the target parameter range.

At step 86, another changed parameter value may be detected or calculated. Then, at step 88, a visual indicator may be moved with respect to the target parameter range. For example, as described above, once the parameter value enters the target parameter range, the target parameter range bar 60 in FIGS. 2 through 8 may become fixed. However, as the parameter value continues to increase, the current measured parameter value indicator 38 may move with respect to the target parameter range bar 60. Next, the method 70 may continue back to step 86 where another changed parameter value may be detected or calculated.

The embodiments disclosed herein provide visualization techniques for re-scaling a target parameter range with respect to an overall parameter range for a parameter value. The disclosed embodiments are particularly beneficial for visualization of measured parameter values of the industrial measurement process 10 illustrated in FIG. 1. However, although the disclosed embodiments may be particular beneficial in dispensing operations, other applications involving visualization of parameter values (e.g., mechanical positioning, calibration, optical focusing, and so forth) may utilize the techniques of the disclosed embodiments. Re-scaling the target parameter range with respect to the overall parameter range effectively provides continuous dynamic zooming for the measured parameter value. This allows for better utilization of the display space 36 of the display device 32 as well as providing continuous feedback to an operator of the industrial measurement process 10 regarding the current measured parameter value, thereby facilitating faster and more accurate operation of the industrial measurement process 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for displaying a visualization of a parameter value, comprising:
displaying a graphical representation of a parameter range;
displaying a graphical representation of a target parameter range which is a subset of the parameter range;
detecting or computing a changed parameter value;
changing the scale of the graphical representation of the target parameter range with respect to the graphical representation of the parameter range as the parameter value changes; and
displaying the changed graphical representation of the target parameter range;
wherein the parameter range is from approximately the parameter value to approximately an upper limit of the target parameter range when the parameter value is less than a lower limit of the target parameter range, and the parameter range is equivalent to the target parameter range when the parameter value is between the upper and lower limits of the target parameter range.

2. The method of claim 1, comprising expanding the graphical representation of the target parameter range over a display space.

3. The method of claim 1, comprising moving a visual indicator of the parameter value with respect to the graphical representation of the target parameter range once the parameter value enters the target parameter range.

4. The method of claim 1, comprising displaying a visual alert once the parameter value enters the target parameter range.

5. The method of claim 1, comprising activating an audio alert once the parameter value enters the target parameter range.

6. A system for displaying a visualization of a parameter value, comprising:
a sensor configured to detect a parameter value;
processing circuitry configured to scale a graphical representation of a target parameter range which is a subset of a parameter range for the parameter value and to re-scale the graphical representation of the target parameter range as the parameter value changes; and
a display device for displaying the graphical representation of the target parameter range and a graphical representation of the parameter range, wherein the parameter range is from approximately the parameter value to approximately an upper limit of the target parameter range when the parameter value is less than a lower limit of the target parameter range, and the parameter range is equivalent to the target parameter range when the parameter value is between the upper and lower limits of the target parameter range.

7. The system of claim 6, wherein the processing circuitry is configured to expand the graphical representation of the target parameter range over a display space of the display device as the parameter value increases.

8. The system of claim 6, wherein the processing circuitry is configured to display a moving visual indicator corresponding to the parameter value on a display space of the display device once the parameter value reaches the lower limit of the target parameter range.

9. The system of claim 6, wherein the processing circuitry is configured to activate an alert once the parameter value approaches the lower limit of the target parameter range.

10. A system for displaying a visualization of a parameter value, comprising:
processing circuitry configured to scale a graphical representation of a target parameter range and a graphical representation of a parameter range, the target parameter range being a subset of the parameter range, for a measured or calculated parameter value, and to re-scale the graphical representation of the target parameter range as the parameter value changes; and
a display device configured to display the graphical representation of the target parameter range and the graphical representation of the parameter range, wherein the parameter range is from approximately the parameter value to approximately an upper limit of the target parameter range when the parameter value is less than a lower limit of the target parameter range, and the parameter range is equivalent to the target parameter range when the parameter value is between the upper and lower limits of the target parameter range.

11. The system of claim 10, wherein the display device is configured to expand the graphical representation of the target parameter range over a display space of the display device as the parameter value increases.

12. The system of claim 10, wherein the display device is configured to display a moving visual indicator corresponding to the parameter value once the parameter value reaches the lower limit of the target parameter range.

13. The system of claim 10, wherein the display device is configured to display a visual alert once the parameter value enters the target parameter range.

14. A method for displaying a visualization of a parameter value, comprising:
detecting a change in a signal representative of a sensed parameter of an industrial system as a value of the parameter is changed by manually controlling an aspect of the industrial system;
processing the sensed parameter signal in a control and measurement device to derive a parameter value to be represented to a human operator;
changing a scale of a graphical representation of a target parameter range with respect to a graphical representation of a parameter range as the parameter value changes, wherein the target parameter range is a subset of the parameter range; and
displaying the graphical representation of the parameter range and the graphical representation of the changed target parameter range, wherein the parameter range is from approximately the parameter value to approximately an upper limit of the target parameter range when the parameter value is less than a lower limit of the target parameter range, and the parameter range is equivalent to the target parameter range when the parameter value is between the upper and lower limits of the target parameter range.

15. The method of claim 14, wherein the graphical representation of the target parameter range approaches the sensed parameter from a first direction until the lower limit of the target parameter range reaches the sensed parameter, and the sensed parameter moves in a second direction relative to the graphical representation of the target parameter range after the lower limit reaches the sensed parameter, wherein the second direction is opposite to the first direction.

16. The method of claim 15, wherein the graphical representation of the target parameter range is displayed as having a first color until the lower limit reaches the sensed parameter, and the graphical representation of the target parameter range is displayed as having a second color after the lower limit reaches the sensed parameter.

17. The method of claim 14, wherein the sensed parameter is a weight measurement of a substance in a container.

* * * * *